(12) United States Patent
Orchard

(10) Patent No.: US 7,401,091 B2
(45) Date of Patent: Jul. 15, 2008

(54) SYSTEM FOR PREPARING MULTIMEDIA CONTENT FOR TRANSMISSION

(75) Inventor: James R. L. Orchard, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 10/498,132

(22) PCT Filed: Sep. 4, 2002

(86) PCT No.: PCT/GB02/03997

§ 371 (c)(1),
(2), (4) Date: Jun. 2, 2004

(87) PCT Pub. No.: WO03/052631

PCT Pub. Date: Jun. 26, 2003

(65) Prior Publication Data

US 2005/0086354 A1   Apr. 21, 2005

(30) Foreign Application Priority Data

Dec. 14, 2001   (GB)   ................................. 0130041.7

(51) Int. Cl.
*G06F 17/00* (2006.01)
*G06F 17/30* (2006.01)
(52) U.S. Cl. ........................ 707/102; 707/10; 707/104.1
(58) Field of Classification Search .................... 707/3, 707/10, 100, 102, 104.1; 713/160, 168
See application file for complete search history.

(56) References Cited

U.S. PATENT DOCUMENTS 5,956,716 A    9/1999   Kenner et al.

| 6,763,071 B1 * | 7/2004 | Maeda et al. .......... 375/240.25 |
| 2003/0023578 A1 * | 1/2003 | Durand et al. ................. 707/1 |

(Continued)

FOREIGN PATENT DOCUMENTS

CN   1301459   6/2001

(Continued)

OTHER PUBLICATIONS

"MPEG-7: Context and Objectives", International Organisation for Standardisation ISO/IEC JTC1/SC29/WG11 Coding of Moving Pictures and Audio, Version—10 Atlantic City, pp. 1-11, Oct. 1998.

(Continued)

*Primary Examiner*—Uyen T. Le
(74) *Attorney, Agent, or Firm*—Sawyer Law Group LLP

(57) ABSTRACT

A method and system for preparing multimedia content, whereby the multimedia content comprises at least one file, comprising content data and associated security functions. The content data further comprises associated characteristics. The system comprises at least one server machine comprising storage for storing the file, at least one client machine comprising means for rendering the file and a network. Firstly, the client machine requests the file (e.g. a movie file). Next, the server machine determines whether it has the file stored in memory. If the file is present, the file's associated security functions (e.g. encryption etc.) are obtained and the file's content data is analyzed to obtain the associated characteristics (e.g. bit rate etc.). Finally, the associated security functions and the associated characteristics are combined into a data structure.

2 Claims, 6 Drawing Sheets

U.S. PATENT DOCUMENTS

| | | | |
|---|---|---|---|
| 2003/0046578 A1* | 3/2003 | Brown et al. | 713/200 |
| 2003/0097657 A1* | 5/2003 | Zhou et al. | 725/46 |
| 2003/0120928 A1* | 6/2003 | Cato et al. | 713/176 |
| 2003/0212893 A1* | 11/2003 | Hind et al. | 713/177 |
| 2004/0030708 A1* | 2/2004 | Cooper et al. | 707/101 |
| 2004/0068659 A1* | 4/2004 | Diehl | 713/182 |
| 2004/0107356 A1* | 6/2004 | Shamoon et al. | 713/193 |
| 2004/0117822 A1* | 6/2004 | Karaoguz et al. | 725/37 |
| 2006/0031489 A1* | 2/2006 | Marcjan | 709/225 |

FOREIGN PATENT DOCUMENTS

| | | |
|---|---|---|
| EP | 1014724 A2 | 6/2000 |
| JP | 2000224257 | 8/2000 |
| JP | 2001-056825 | 2/2001 |
| WO | 9948296 | 3/1999 |
| WO | WO 99/48296 | 9/1999 |
| WO | WO 01/48582 | 5/2001 |

OTHER PUBLICATIONS

"RealServer Administration Guide" (RealServer 8.0). RealNetworks, Inc. 2000. 462 pages.

"Advanced Streaming Format (ASF) Specification", Microsoft Corporation and RealNetworks, Inc., Feb. 26, 1998, pp. 1-56.

"Compound AV Objects and IPMP—Questions to be Asked", ISO/TC 46/SC 9/Working Group 1 for ISO Project 15706: Internatonal Standard Audiovisual Number ( ISAN), pp. 1-12, Feb. 25, 1999.

International Search Report for PCT/GB 02/03997.

MPEG-7: Context and Objectives, International Organisation for Standardisation ISO/IEC JTCI/SC29/WG11 Coding of Moving Pictures and Audio, version 10 Atlantic City, pp. 1-11, Oct. 1998.

* cited by examiner

SYSTEM FOR PREPARING MULTIMEDIA CONTENT FOR TRANSMISSION

FIELD OF THE INVENTION

The present invention relates to preparing multimedia content, in order to stream the content from a remote server to a local client machine.

BACKGROUND OF THE INVENTION

Multimedia, namely, the combination of text, animated graphics, video, and sound, presents information in a way that is more interesting and easier to grasp than text alone. It has been used for education at all levels, job training, and games by the entertainment industry. It is becoming more readily available as the price of personal computers and their accessories declines.

Digital technology's exponential decline in price and increase in capacity has enabled it to overtake analogue technology. The Internet is the breeding ground for multimedia ideas and the delivery vehicle of multimedia objects to a huge audience. The World Wide Web is the Internet's multimedia information retrieval system. In the Web environment, client machines communicate with Web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer (Internet Explorer is a trademark of Microsoft Corporation), which are applications running on a client machine, enable users to access information by specification of a link via the URL and to navigate between different HTML pages.

Multimedia systems need a delivery system to get the multimedia objects to the user. Magnetic and optical disks were the first media for distribution. The Internet, as well as the Transmission Control Protocol/Internet Protocol (TCP/IP) protocol suite or Net BIOS on isolated or campus LANs, became the next vehicles for distribution. The rich text and graphics capabilities of the World Wide Web browsers are being augmented with animations, video, and sound. Internet distribution will be augmented by distribution via satellite, wireless, and cable systems.

Nowadays, multimedia generally indicates a rich sensory interface between humans and computers or computer-like devices; an interface that in most cases gives the user control over the pace and sequence of the information. An example of a multimedia application, is movies on demand (also known as video on demand (VOD)), in which a viewer can make selections from a large library of videos and then play, stop, or reposition the tape or change the speed. In more detail movies on demand is a service that provides movies on an individual basis to television sets in people's homes. The movies are stored on a central server (termed a content server in this description) and transmitted through a communication network. A set-top box (STB) connected to the communication network converts the digital information to analogue and inputs it to the TV set. The viewer uses a remote control device to select a movie and manipulate play through start, stop, rewind, and visual fast forward buttons. The capabilities are very similar to renting a video at a store and playing it on a VCR. The service can provide indices to the movies by title, genre, actors, and director. VOD differs from pay per view by providing any of the movies at any time, instead of requiring that all purchasers of a movie watch its broadcast at the same time. However, watching the movie on a TV set attached to a videocassette recorder (VCR) with the same abilities to manipulate the play is not considered multimedia.

Initially, the type of information distributed was primarily in the form of text and graphics. Later, images and stored audio and video files emerged. Typically, these audio and video files are downloaded from a server and stored at the client machine. A "player" then renders the files before they are "played" on the client machine. Advantageously, downloading allows a user to view files of any format, however, downloading can take time if a user's network connection is "slow" and once downloaded, the files may take up space on the user's hard drive (on the client machine).

As an alternative, streamed audio and video (whereby a stream comprises a single type of data—e.g. audio) have become available from both stored and live sources on the Web. Audio and video streaming enables client machines to select and receive audio and video content from servers across the network and to begin hearing and seeing the content as soon as the first few bytes of the stream arrive at the client machine. Therefore, the actual content of the media files remains on the server and the client machine receives the content of the files as "streams" of data. Although streaming solves some of the problems associated with downloading, playback quality becomes dependent on the network connections.

Streaming media requires that data be transmitted from a content server to a client machine at a sustained bit rate that is high enough to maintain continuous and smooth playback at the receiving client machine. Typically, a client machine requests multimedia data and hypermedia (the combination of hypertext and multimedia) data from a content server. The content server is responsible for streaming the data to the client machine for rendering/playing.

In order to manage the streaming and rendering, it is important that the requesting client machine (specifically an "decoder" application, which converts the incoming stream for rendering on the client machine) understands the characteristics of the stream it will receive and play, such as the frame rate or the sample rate etc. This is often achieved during a client-server "handshake" communication, whereby client machines and server machines communicate over a communications network. For example, if a client machine does not have the capability to handle an incoming audio stream (e.g. because it cannot render the number of frames per second or cannot render an audio stream above a certain sample rate), then there is no need to progress the client machine's request.

Currently, the multimedia content that exists comprises different characteristics and in addition the characteristics are defined in different ways by different file formats. This results in a vast amount of varying multimedia content and no common method for indexing it. Furthermore, if characteristics are not readily available to a decoder, it may have to do some analysis to "guess" at them (for example, by analyzing file extensions e.g. ".avi", ".mov" etc.) or it may have to do some processing to find the characteristics, if they are situated in a different location to that it is expecting.

In one prior art solution from Microsoft Corporation, the source (which can be one of a number of a variety of formats) is compressed and encoded in the ASF (Advanced Streaming Format) file format, which is based on objects. More information can be found in the book "Inside Windows Media" by Microsoft Corporation, 1999, ISBN 0-7897-2225-9.

Three types of ASF objects exist, representing:
A Header object—defines the characteristics of the stream, or sub-streams
A Data object—comprises the digitized data packets of the media streams or sub-streams
An Index object—defines index entries which point to the data packets, in order to synchronize streams to a common timeline, so that video and audio streams are not out of synch for example.

The ASF header object comprises a "stream properties" object, defining the properties of each stream. The ASF header can be user by the client machine separately from the other two objects, so that the requesting client machine can prepare to process ASF files, for example, to "play" them.

Whilst the ASF format partially solves the problem, many media files exist only in other commonly used formats such as MP3, MPEG, MPEG4, MHEG etc. This means that content owners have little desire to perform media conversions, as this can be time consuming. Furthermore, content owners frequently need to define various characteristics of the stream delivery, for example, whether the streams are to be protected or flowed "in-the-clear" (that is, unprotected, not encrypted etc.).

Thus, there is a need for less time-consuming maintenance for an administrator, especially if the properties of a stream were to change frequently, and for analysis and preparation of pre-authored multimedia content of any kind.

DISCLOSURE OF THE INVENTION

According to a first aspect, the present invention provides a method of preparing multimedia content, in which said multimedia content comprises at least one file, said at least one file comprising content data and associated security functions, said content data comprising associated characteristics, in a distributed data processing system comprising: at least one server machine comprising storage for storing said at least one file; at least one client machine comprising means for rendering said at least one file, and a network, said method comprising the steps of: requesting, by said at least one client machine, at least one file; in response to said requesting step, determining by said at least one server machine, whether said at least one file is stored in said memory; in response to a successful determining step, for said at least one file, obtaining associated security functions; analyzing content data to obtain said associated characteristics, and combining said associated security functions and said associated characteristics into a data structure, wherein said combined associated security functions and said associated characteristics are stored separately to said content data.

In a preferred embodiment, the server machine utilizes the data structure (termed a "profile" herein) to prepare for transmitting the content data to the client computer machine. Preferably, the data structure is transmitted to the client machine and once received, the client machine determines whether the data structure can be processed. If the data structure can be processed, the client machine utilizes the data structure to prepare for rendering the content data. Once rendered, the content data can be viewed on the client machine, via a media player.

Advantageously, quality of service attributes (e.g. minimum data rate required) are applied to the content data. Preferably, the server machine and the client machine utilize a handshaking protocol for communicating and negotiating the quality of service attributes. The server machine de-multiplexes the content data before it is transmitted to the client machine and then the content data is re-multiplexed before it is rendered.

The content data comprises at least one data stream and the data stream further comprises at least one data sub-stream. Preferably, one composite data stream is associated with one data structure, whereby the data structure comprises a hierarchy of objects. The objects represent data streams and sub-streams.

In a preferred embodiment, the server machine processes the obtaining, analyzing and combining steps described above. The file comprising the content data and associated security functions also has associated header data.

According to a second aspect, the present invention provides a distributed data processing system for preparing multimedia content, in which said multimedia content comprises at least one file, said at least one file comprising content data and associated security functions, said content data comprising associated characteristics, said distributed data processing system further comprising: at least one server machine comprising storage for storing said at least one file; at least one client machine comprising means for rendering said at least one file, and a network, said system comprising: means for requesting at least one file; means, responsive to said means for requesting, for determining by said at least one server machine, whether said at least one file is stored in said memory; means, responsive to a successful determination, for obtaining associated security functions for said at least one file; means for analyzing content data to obtain said associated characteristics, and means for combining said associated security functions and said associated characteristics into a data structure, wherein said combined associated security functions and said associated characteristics are stored separately to said content data.

According to a third aspect, the present invention provides a computer program product comprising computer program code stored on a computer readable storage medium which, when executed on a computer, performs the method as described above.

BRIEF DESCRIPTION OF THE DRAWINGS

The present invention will now be described, by way of example only, with reference to preferred embodiments thereof, as illustrated in the following drawings.

DETAILED DESCRIPTION OF THE INVENTION

Figure 1:
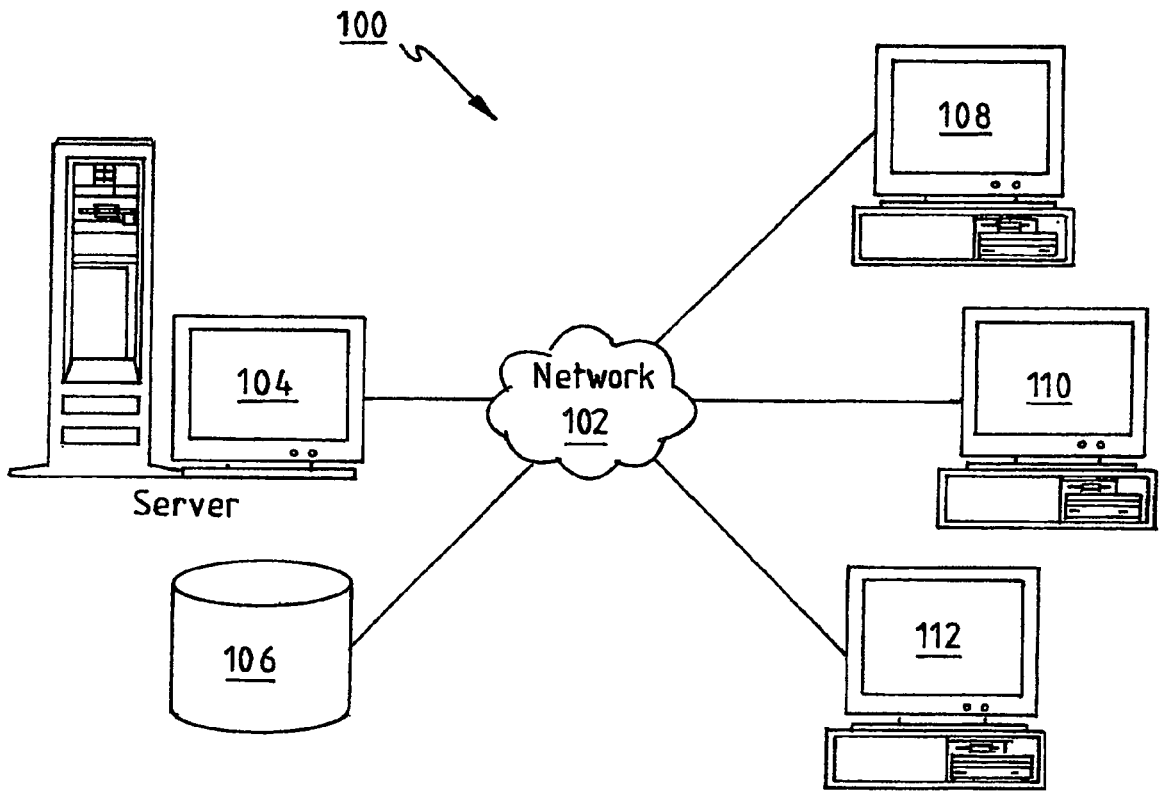
FIG. 1 shows a distributed data processing system in which the present invention may be implemented.

FIG. 1 shows a representation of a distributed data processing system in which the present invention may be implemented. Distributed data processing system (100) comprises a number of computers, connected by a network (102). Server computer (104) is preferably a Web server and is connected to network (102) along with a storage unit (106) and client computers (108), (110) and (112). In the depicted example, distributed data processing system (100) is the Internet, with network (102) representing a world-wide collection of networks and gateways that use the transmission control protocol over internet protocol (TCP/IP) suite of protocols to communicate with one another. Multimedia systems generally comprise suitable organizations of clients, application servers, and storage servers that communicate through a network. Some multimedia systems are confined to a stand-alone computer system with content stored on hard disks or CD-ROMs. Distributed multimedia systems communicate through a network and use many shared resources.

Figure 2:
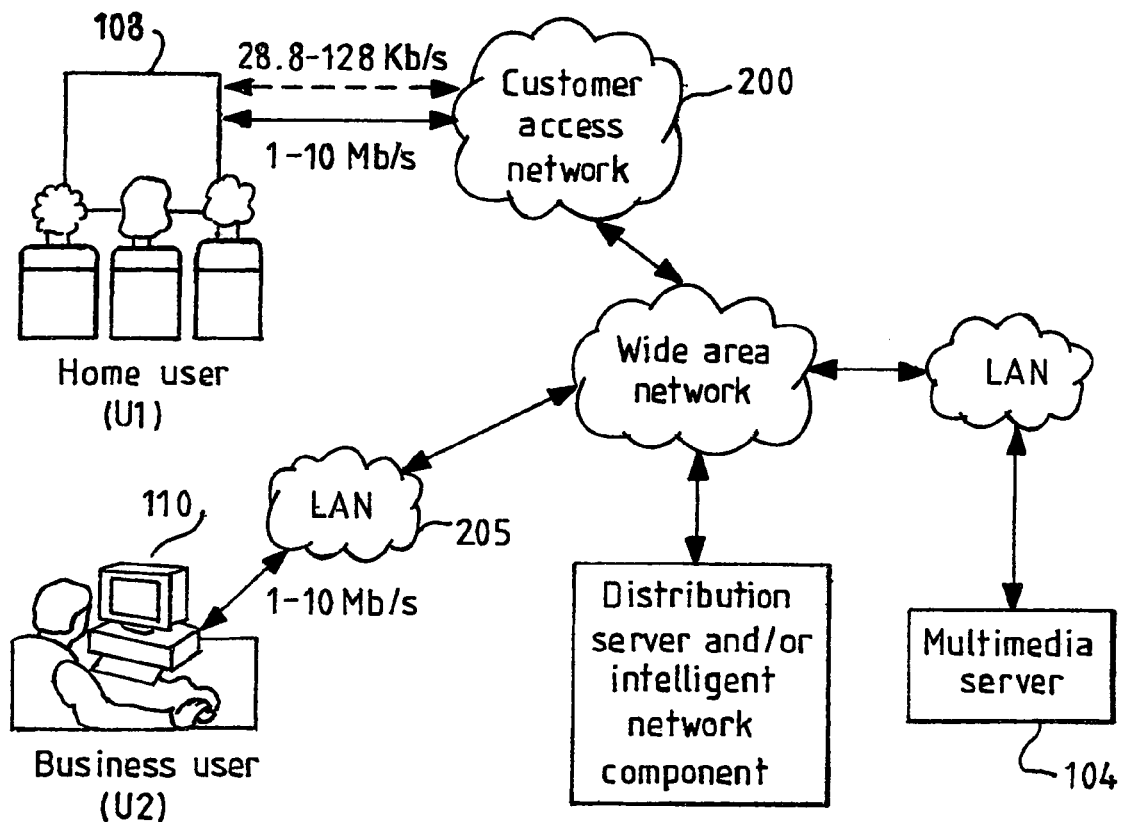
FIG. 2 shows a generalized environment supporting multimedia applications to homes or to business environments.

FIG. 2 shows a generalized environment supporting multimedia applications to homes or to business environments. U1 represents a user at home having access to an application or service through an access network (200), while a business user (U2) is connected through a local area network (205), for example, a customer-premises network. A multimedia server (210) delivers services (that is, multimedia data streams) over a series of (possibly) heterogeneous networks to the client machines. (Further processing can take place within the network, for example, multicasting, transformation of content etc.)

Generally, the present invention provides a mechanism for creating a media file "profile" as and when required. For example, if there is a "pull" request for a multimedia file from a remote client machine, a profile is generated and is used both at the content server and (after transfer) in the requesting client machine, to manage the streaming and rendering of the media data.

Figure 3:
FIG. 3 shows a representation of a composite multimedia stream.

In the description, a "profile" should be understood as a data structure comprising a definition of the stream "characteristics" required for delivery of the composite stream or sub-streams, for example, the bit rate—generally, characteristics describe the properties of the streams or sub-streams. Furthermore, the profile is preferably utilized to encapsulate the characteristics (whereby the characteristics include the "protection policy"). A composite stream (300) is shown in FIG. 3. In the example, the stream (300) comprises four sub-streams (305-320), three sub-streams of audio data and one sub-stream of video data. Preferably, each composite stream is associated with a profile.

Advantageously, since the characteristics are stored separately from the content, the characteristics can be easily modified. For example, the characteristics can be stored on an external database or within a system header associated with a media file. As an example, if a user wishes to download a movie, a movie for an adult audience may comprise extra protection policies, such as encryption, whereas a movie for children does not necessarily require encryption. Advantageously, by holding the characteristics independently and due to the present mechanism picking up characteristics "on-the-fly", a protection policy for example is immediately implemented.

Figure 4:
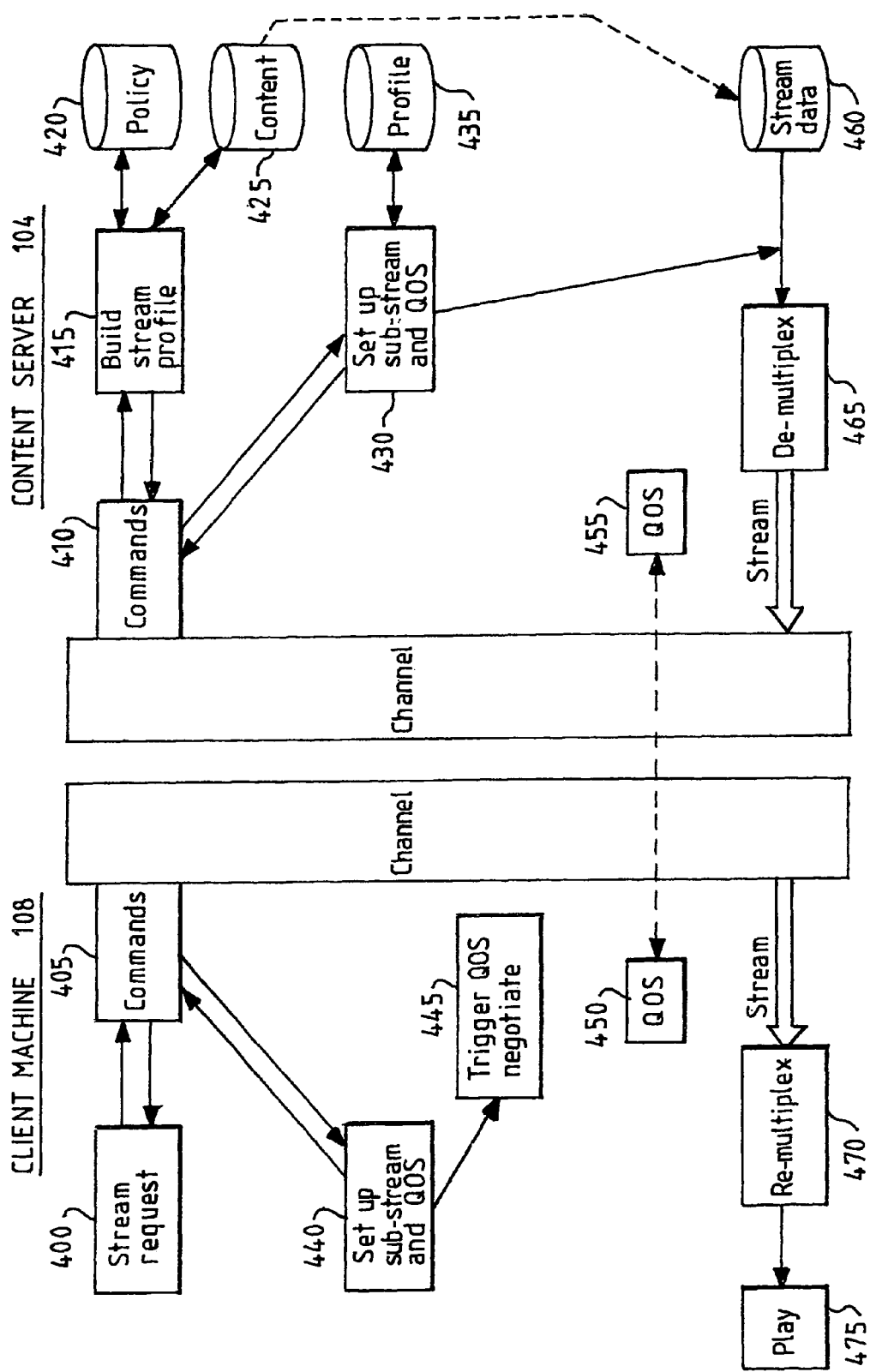
FIG. 4 shows an overview of a client machine issuing a "pull" request for a media file from a content server, according to the present invention.
Figure 5:
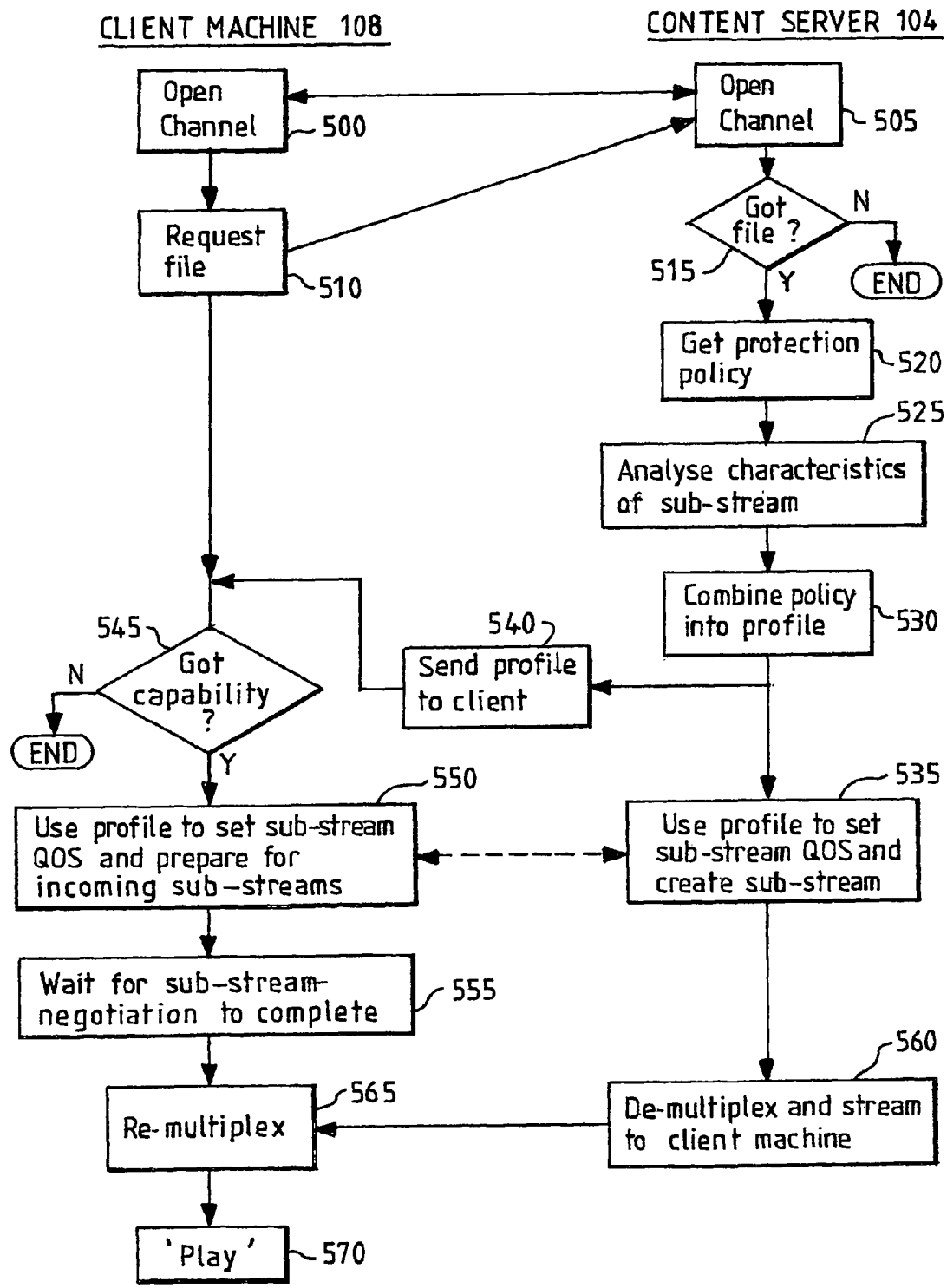
FIG. 5 is a flow chart showing the operational steps involved in the process of FIG. 4, according to the present invention.

FIG. 4 shows a typical scenario of a client machine (108) issuing a "pull" request for a media file, according to the present invention. It will be described with reference to FIG. 5. Firstly, a user of a client application triggers a request (400) to play a particular media file. This initiates a channel command (405) to the content server (104), whereby a communication channel is opened (step 500) from the client machine (108) to the content server (104). Next, the content server (104) also initiates a channel command (410) to the client machine (108), and opens (step 505) a communication channel to the client machine (108). The client machine (108) can now request (step 510) a media file.

Next, the context server (104) determines (step 515) whether it has the requested file in storage. If the file is not present in storage (negative result to step 515), preferably, a message to that effect is sent to the client machine (108) and the process for the current request ends. Of course, the client machine (108) can re-start the process (at step 500) by requesting another file.

If the server (104) has the requested file (positive result to step 515), it initiates (415) dynamic media file profile creation. Firstly, policy characteristics (held on an external database (420) for example) are accessed (step 520). For example, a policy file detailing the amount or type of protection required can be accessed. Next, the content of the media file is accessed (step 525) from the content library (425), and its characteristics (number of sub-streams, frame rate etc.) are analyzed. Finally, the characteristics of the stream are encapsulated (step 530) along with the protection policy to be enforced, into a "profile" (435).

The content server (104) uses the profile (435), in order to prepare the file for streaming. Specifically the sub-stream and "QoS" (Quality of Service) objects are prepared (430, step 535). The sub-stream objects are created and the QoS objects are "items" that can be applied to the sub-streams (whereby each sub-stream has an associated QoS object) as opposed to characteristics, which are properties of the sub-streams. Examples of the attributes of QoS objects include: the minimum data rate required, the maximum error rate tolerated, the compression algorithm to be used and security functions, such as, encryption.

The profile is returned (step 540) to the requesting client machine (108) and the client machine (108) then determines (step 545) whether it has the necessary functionality to accept the profile. For example, if the media file being requested is a ".mpeg" file, then the client machine (108) will do some processing to check whether it comprises the relevant ".mpeg" decoder present. If the client machine (108) determines that it does not have the capability (negative result to step 545) to accept the media file, the process ends. Of course, the client machine (108) can re-start the process (at step 500) by requesting another file. However, if the client machine (108) determines that it does have the capability (positive result to step 545) to accept the media file, it uses the received profile to set up (440, step 550) the necessary sub-stream and QoS objects.

Next, a negotiation (445, step 555) between the client machine (108) and the content server (104) occurs, in order to resolve QoS items. For example, a user of a requesting client application may be challenged to authenticate himself/herself and then will be asked whether or not he/she will accept a monetary charge for the stream or sub-streams of data. It should be understood that if the user at a client machine (108) is not prepared to accept the media—for example, if the user does not wish to pay for a media file or if the user does not have the correct technology to "play" a media file—then the process ends. However, if the user wishes to go ahead with accepting the media file, the requesting client machine (108) triggers the secure negotiation between peer sub-stream QoS objects (450, 455). Specifically, the peer objects (450, 455) exchange data via the secure channels, enabling shared context (e.g. QoS programs, QoS data etc.) to be established (for example, establishing shared cryptographic keys etc.).

When the sub-stream negotiations are complete and the objects are all enabled, the requesting client machine (108) triggers the "playing" of the media file. The stream data (460) (from the content library (425)) is preferably de-multiplexed (465, step 560) from a composite stream of data (e.g. a composite stream comprises one video stream and three audio streams) to separate sub-streams. This enables different QoS objects to be applied to different sub-streams. For example, different compression technology can be applied to different sub-stream types. Furthermore, the content server (104) can apply characteristics, as well as protection, to the multiple sub-streams as required.

Next, the sub-streams are flowed (step 560) to the client machine (108). The client machine (108) processes the QoS objects (e.g. decompression). The processed sub-streams are then preferably re-multiplexed (470, step 565) and passed as a composite stream to a "Media Player", such as RealPlayer (RealPlayer is a registered trademark of Real Networks, Inc.) or Windows Media Player (Windows Media is a trademark of Microsoft Corporation) for playing (475, step 570) on the client machine (108).

Figure 6:
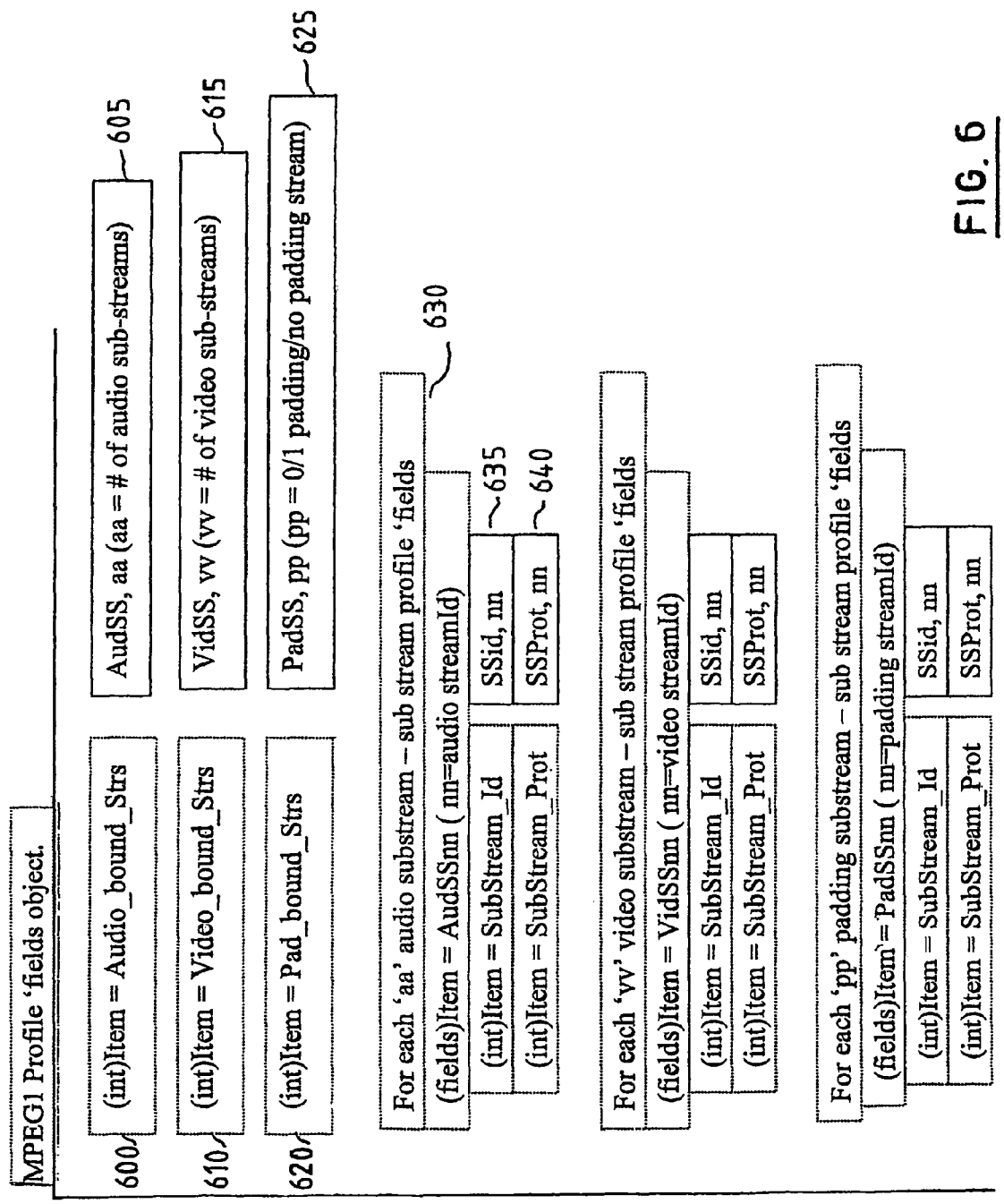
FIG. 6 shows an example "profile", according to the present invention.

FIG. 6 shows an example of a hierarchically built profile for an "mpeg1" stream, whereby three "fields" objects representing data for an audio stream (600), video stream (610) and a "padding" stream (620) are shown. The associated objects (605-625) represent additional data associated with the streams. For example, in the case of the audio stream (600), the number of audio sub-streams present is detailed (605).

In the hierarchy of the preferred implementation, each of the sub-streams (identified by the additional data) are associated with further objects. For example, a "fields" object (630) represents data for one audio sub-stream. The object (630) encapsulates data representing a unique sub-stream identifier (635) and the protection policy (640) for the sub-stream. Further objects for a plurality of audio sub-streams (or video sub-streams) may also be included in the profile, but these are not shown.

In the preferred implementation, the data in the profile is obtained from system-header information associated with an "mpeg1" stream. It should be understood that the data in the profile could be obtained from any other location. If a particular format of media file does not have an associated system header, then the data could be obtained from an external database.

An "mpeg1 movie" file (essentially a "flat" file) comprises different sections. The architecture of this file defines the location of data within the file. In this case, by parsing the flat file, it is known that the system-header information is found after a 4-byte identifier. Once located, the system-header information can be extracted. The parsing process steps through the file (validating the system header information, extracting sub-stream specific data etc.) until the profile is complete. It should be understood, that the profile described herein is for example purposes only and the profile could be implemented in any other way.

Figure 7:
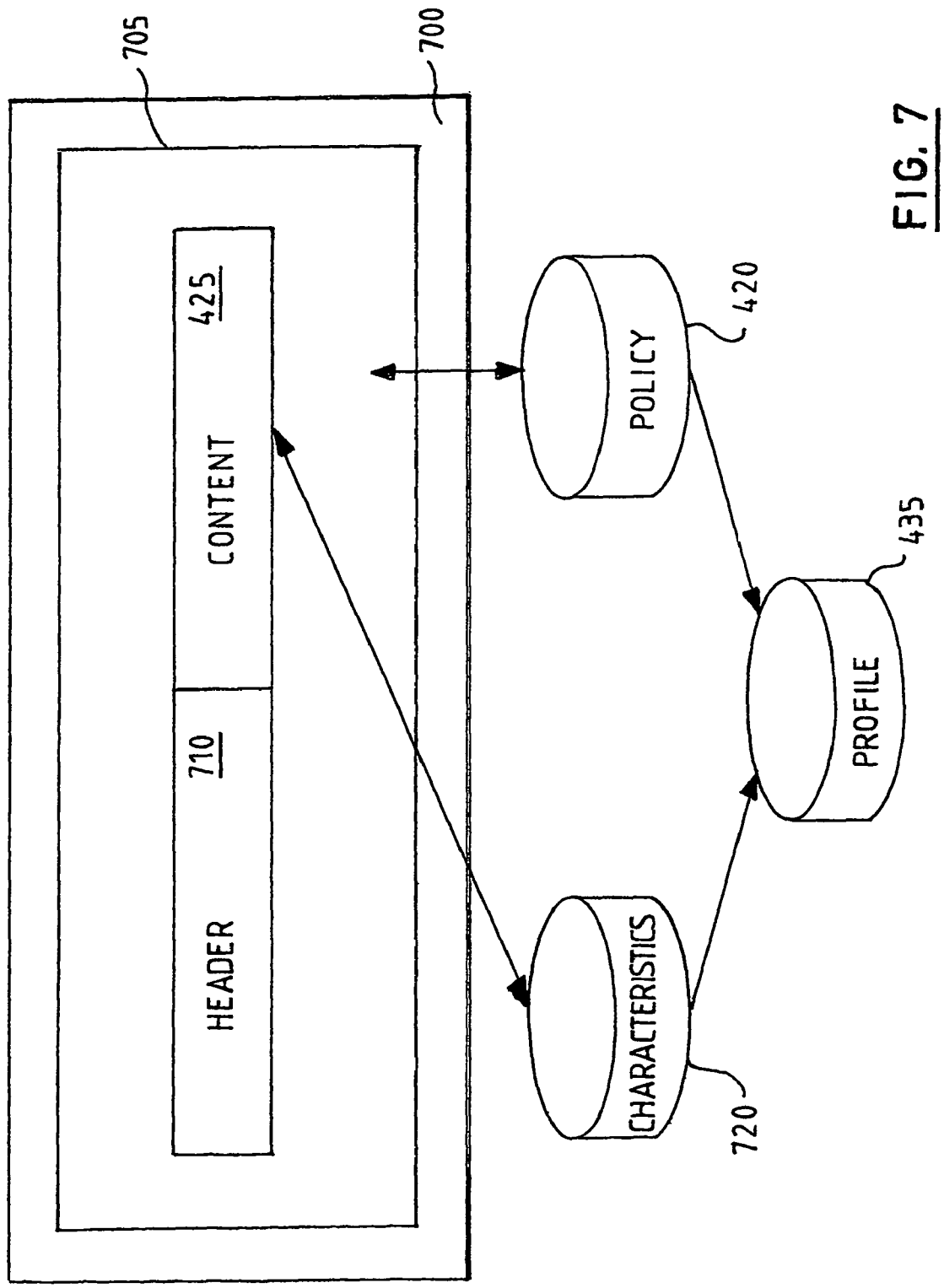
FIG. 7 shows an overview of preparing multimedia content, according to the present invention.

It will be apparent from the above description that, by using the techniques of the preferred embodiment characteristics associated with multimedia streams and protection policy data for a multimedia file can be separately held and managed from the stream content. In FIG. 7, there is shown multimedia content (700) comprising more specifically of a multimedia file (705). The multimedia file (705) comprises a system header (710) (although this is optional and in fact missing in files of a certain format) and content data (425). According to the present invention, the characteristics (720) associated with the content (streams) and the policy data (420) associated with the multimedia file (705) are dynamically combined into a data structure, or profile (435). Advantageously, characteristics and protection policy data can be easily changed by a systems administrator or by a content provider.

It should be understood that the process of de-multiplexing and re-multiplexing is optional, however, there are advantages to the process. For example, a movie media file comprising subtitles in various languages (e.g. English, Spanish, German and Chinese) is requested from a client machine in China and the file is also requested from a client machine in the United Kingdom. An administrator could set up the content server so that the file is streamed to the client machines with different QoS objects. For example, if the media file is requested from a Chinese speaking user, the file could be streamed along with Chinese language subtitles only. However, if the media file is requested from an English speaking user, the file could be streamed along with English language subtitles only. Obviously, this would be beneficial for the streaming overhead.

Beneficially, because a profile is dynamically generated, it supports the dynamic application of QoS objects and characteristics. Therefore, the present invention facilitates the management of additional stream delivery characteristics. An advantage of the present invention is that more flexibility is offered by enabling the efficient management of streams of several commonly used formats and is non-intrusive of existing content. Therefore, by not restricting to certain types of file format, authoring tools do not have to be used or re-used to manipulate the content of the media files.

A further advantage of the present invention allows efficient delivery of stream data, without the necessity for the existence a particular type of header or equivalent data prefacing the media file.

Advantageously, a flexible super-set of "media file header information" is provided. Furthermore, since it is the profile (and not the data content) that is initially sent to the client machine, the processing overhead is kept low. For example, by only sending the profile to the client machine, even if a client machine cannot accept the data content, network resources have not been strained, since the profile is comparatively smaller in size than the data content.

It should be understood that although the preferred embodiment has been described with a single client computer and a single server computer, the present invention could be implemented in any environment. For example, communication could take place between two or more server computers, between two or more client computers, between a plurality of both server computers and client computers etc.

The invention claimed is:

1. A distributed data processing system for preparing multimedia content, in which said multimedia content comprises at least one file, said distributed data processing system further comprising: at least one first computer system comprising storage for storing said at least one file; at least one second computer system comprising means for rendering said at least one file, and a network, said distributed data processing system comprising:

means for requesting at least one file comprising content data;

means, responsive to said means for requesting, for determining by said at least one first computer system, whether said at least one file is stored in said storage;

means, responsive to a successful determination, for obtaining associated security functions for said at least one file;

means for analyzing said content data to obtain associated characteristics, and means for combining said associated security functions and said associated characteristics and means for combining said associated security functions and said associated characteristics into a data structure, wherein said data structure comprising said associated security functions and said associated characteristics is separate from said at least one file comprising said content data;

combining said associated security functions and said associated characteristics into a data structure, wherein said data structure comprising said associated security functions and said associated characteristics is separate from said at least one file comprising said content data, wherein said at least one first computer system utilizes said data structure to prepare for transmitting said content data, wherein said content data comprises at least one data stream, wherein said at least one data stream is associated with a data structure, wherein said data structure comprises a hierarchy of objects, representing said at least one data stream and said at least one sub-stream, wherein said at least one data stream comprises at least one data sub-stream, wherein said at least one said file further comprises header data;

means for transmitting said data structure to said at least one second computer system;

means for in response to receiving said data structure, determining by said at least one second computer system whether said data structure can be processed; and in response to a successful determining step, utilizing by said at least one second computer system said data structure to prepare for rendering of said content data.

2. A computer program product comprising computer program code stored on a computer readable storage medium which, when executed on a computer, performs the method of preparing multimedia content, in which said multimedia content comprises at least one file, in a distributed data processing system comprising: at least one first computer system comprising storage for storing said at least one file: at least one second computer system comprising means for rendering said at least one file, and a network, said method comprising:

requesting, by said at least one second computer system, at least one file comprising content data;

in response to said requesting step, determining by said at least one first computer system, whether said at least one file is stored in said storage;

in response to a successful determining step, for said at least one file, obtaining associated security functions;

analyzing said content data to obtain associated characteristics, and combining said associated security functions and said associated characteristics into a data structure, wherein said data structure comprising said associated security functions and said associated characteristics is separate from said at least one file comprising said content data, wherein said at least one first computer system utilizes said data structure to prepare for transmitting said content data, wherein said content data comprises at least one data stream, wherein said at least one data stream is associated with a data structure, wherein said data structure comprises a hierarchy of objects, representing said at least one data stream and said at least one sub-stream, wherein said at least one data stream comprises at least one data sub-stream, wherein said at least one said file further comprises header data;

transmitting said data structure to said at least one second computer system;

in response to receiving said data structure, determining by said at least one second computer system whether said data structure can be processed; and in response to a successful determining step, utilize by said at least one second computer system said data structure to prepare for rendering of said content data.

* * * * *